United States Patent [19]

Teucci

[11] 4,441,958

[45] Apr. 10, 1984

[54] FORCED-CIRCULATION EVAPORATOR PLANT

[76] Inventor: Giampaolo Teucci, Villa Emilia, Ortignano Reggiolo, Italy

[21] Appl. No.: 339,676

[22] Filed: Jan. 15, 1982

[30] Foreign Application Priority Data

Jan. 27, 1981 [IT] Italy .................... 19340 A/81

[51] Int. Cl.³ ............... B01D 1/04; B01D 1/20; B01D 1/26
[52] U.S. Cl. ................. 159/2 MS; 159/18; 159/46; 159/DIG. 8
[58] Field of Search ........... 159/2 MS, 4 MS, 17 R, 159/18, 26 R, 46, DIG. 8, DIG. 22; 202/174

[56] References Cited

U.S. PATENT DOCUMENTS

| | | | |
|---|---|---|---|
| 3,332,470 | 7/1967 | Chirico et al. | 159/46 |
| 3,647,638 | 3/1972 | Osdor | 159/2 MS |
| 3,702,807 | 11/1972 | Newson et al. | 159/2 MS |
| 3,738,411 | 6/1973 | Lazar | 159/46 |
| 3,844,899 | 10/1974 | Sager | 159/2 MS |
| 3,926,739 | 12/1975 | Izumi | 159/2 MS |
| 4,026,760 | 5/1977 | Connally | 159/46 |
| 4,030,985 | 6/1977 | Barba et al. | 202/174 |

*Primary Examiner*—Bradley Garris
*Attorney, Agent, or Firm*—Darby & Darby

[57] ABSTRACT

A forced-circulation evaporator plant for concentrating products such as liquid distillation residues and caustic soda has a circulating pump for circulating a product to be concentrated to a battery of heat exchangers interconnected in series. The last exchanger in the series is directly heated with steam. All of the other exchangers are heated by water vapors generated by the evaporation of the product to be concentrated in a battery of flash drums traversed in series by the product and by steam from hot condensate liquids coming from the same exchangers.

5 Claims, 1 Drawing Figure

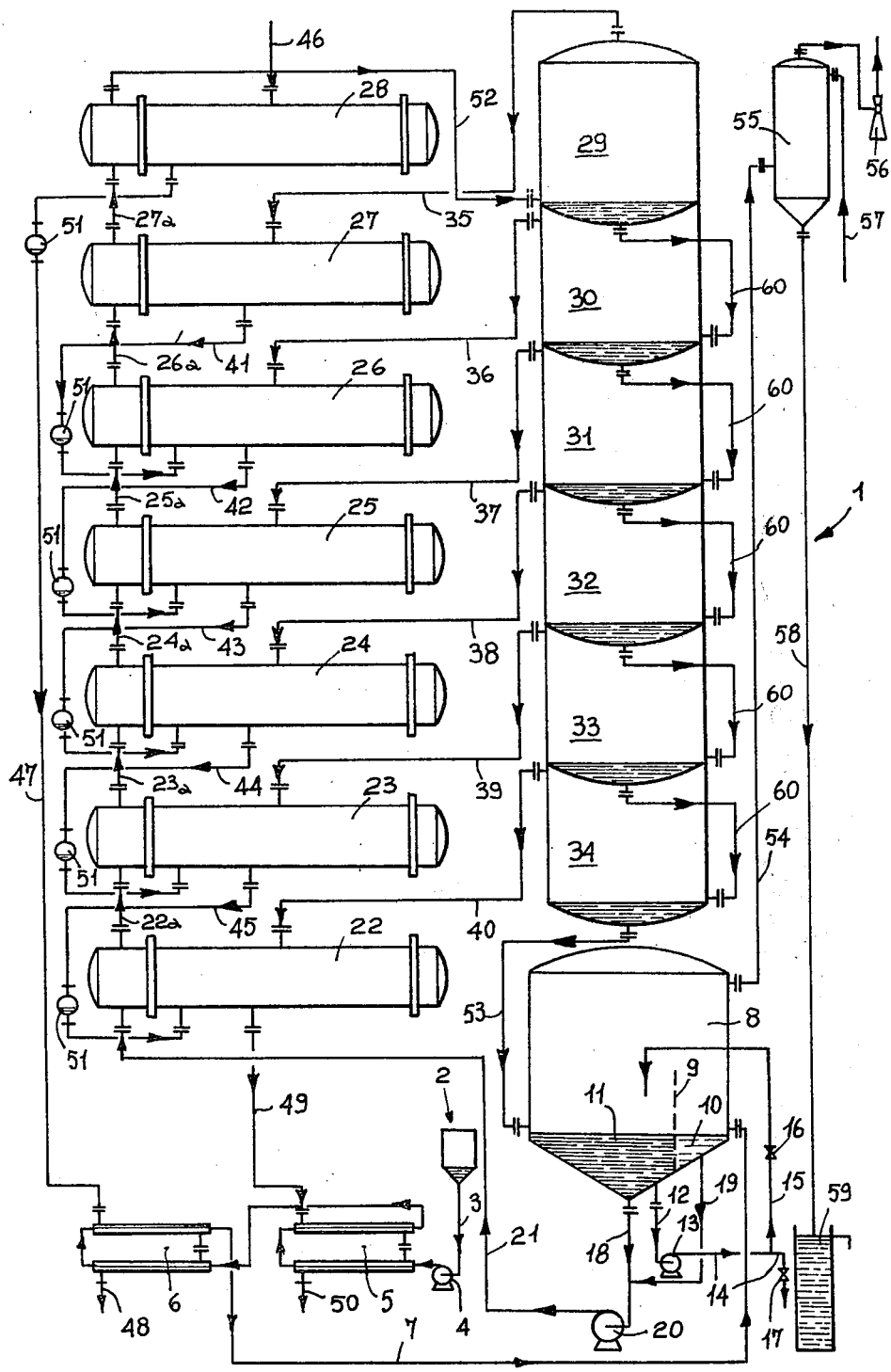

FORCED-CIRCULATION EVAPORATOR PLANT

FIELD OF THE INVENTION

This invention relates to a forced-circulation evaporator plant having low energy requirements, for concentrating products such as grape-must, liquid distillation residues, caustic soda and the like, which can be utilized in different fields ranging from the food manufacturing to the chemical industry.

BACKGROUND OF THE INVENTION

At present, the technology employed in these plants involves the use of multistage concentrators, each of them including a heat exchanger, a flash drum and a circulating pump. The liquid to be concentrated is sent by the pump to the heat exchanger where it undergoes a predetermined positive increment in temperature, then it goes into the flash drum where, owing to the presence of a lower pressure than in the exchanger, it evaporates and there is consequently production of steam which in turn is used to heat the next stage, also including a heat exchanger, a flash drum and a pump and so on, up to a certain number of stages until the steam produced in the last stage is sent to a condenser which can be either of the mixture type or of the surface type.

The first stage is heated by steam coming directly from the system while the product to be concentrated goes from one stage to the next either by means of pumps or, less commonly, owing to the difference in pressures existing between one stage and the next.

In these plants, as described above, there are as many circulating pumps as stages; this means that a multistage plant can only have a limited number of stages, since the amount of steam produced by the boiler and used to operate the turbine which in turn actuates the product circulating pumps must be such that it can be completely absorbed by the first stage.

Therefore, if the number of stages is to be increased, it is necessary to supply additional circulating pumps powered by additional electric motors. This involves greater energy requirements.

OBJECTS

A principal object of the present invention is to eliminate the drawbacks of conventional systems noted above and others which will become more evident in the course of the description, taking advantage of a single circulating pump so that there are lower energy requirements and lower installation costs too, together with a greater and more functional exploitation both of the water vapors produced in the flash drums and of the vapors coming from the hot condensate liquids in the exchangers.

SUMMARY OF THE INVENTION

These problems are solved, according to the present invention, by a forced-circulation evaporator plant having low energy requirements, for concentrating products such as grape-must, liquid distillation residues, caustic soda and the like. The device is characterized in that it comprises a feed tank to feed the product to be concentrated, which directly communicates with a product feed pump by means of suitable pipelines. One or more batteries of series preheaters is provided, of the tube nest type, through which the product to be concentrated flows. Piping conveys the product from the battery of preheaters to a flash drum, which is respectively provided with: a partition to divide the concentrated product from the product to be concentrated; an exhaust for the water vapor produced therein, connected to a vacuum condenser by suitable piping; and a discharge for the concentrated product connected to an extraction pump through suitable piping. The pump is provided both to send a part of the concentrated product to a using area and to bring back the remaining part of the concentrated product inside said flash drum, into the concentrated product section. The pump is controlled in so doing by specifically calibrated valves. The flash drum is further provided with an inlet for the concentrated product coming from a battery of flash drums disposed upwardly thereof, and with two outlets. One outlet is on the concentrated product side and the other is on the side of the product to be concentrated. The outlets are interconnected at the intake opening of a circulating pump which, through suitable pipelines, sends the product to be concentrated, under pressure, to a battery of heat exchangers which are interconnected in series close to the product side. The last heat exchange is directly heated by steam coming from the system, which is also used to operate a turbine, which in turn operates the circulating pump. The other heat exchangers are heated partly by water vapors derived from the evaporation to which the product is subjected in the battery of flash drums and partly by steam derived from the hot condensate liquids obtained in the exchangers. The steam flows countercurrent to the product flow and passes from one exchanger to the one placed immediately before. The steam reaches the exhaust after having passed through and heating the battery of preheaters. The exhaust of the product from the last exchanger is connected, through suitable pipelines, to the first flash drum forming part of the flash drum battery. The number of flash drums is equal to the number of exchangers less one, and the flash drums are traversed in series by the product to be concentrated. In passing from one flash drum to the next the product expands and releases water vapor. The last flash drum of the battery has its outlet in communication, by means of suitable pipelines, with the above mentioned flash drum provided with a partition, which in turn directly communicates with the above mentioned condenser. A vacuum has been formed in that condenser by an ejector or a vacuum pump or the like, and steam produced in the flash drum is condensed in that condenser. The condensed steam can be either sent to the exhaust or conveniently recycled after cooling in a suitable cooling tower.

DRAWING

Further features and advantages of the invention will best be understood from the detailed description of a preferred embodiment of a forced-circulation evaporator plant having low energy requirements, for concentrating products such as grape-must, liquid distillation residues, caustic soda and the like, made hereinafter with reference to the accompanying drawing, given by way of example only in which the sole figure is a diagram of a preferred plant constructed in accordance with the invention and its operating components.

DESCRIPTION OF A PREFERRED EMBODIMENT

The drawing shows a plant constructed in accordance with the present invention.

The product to be concentrated or feed product, stored in tank 2, directly communicates, through a piping 3, with the intake opening of a feed pump 4. The pump 4 allows the feed product to pass through two or more preheaters 5 and 6. The preheaters 5 and 6 are for example of the tube nest type where the passage of the product to be preheated occurs inside the tubes.

Through piping 7 the feed product reaches the interior of a flash drum 8. Inside the flash drum 8 there is a partition 9 that forms a first compartment for the product 10 not yet concentrated and a second compartment for the concentrated product 11. The compartments 10 and 11 together form a product storage means.

In the lower part of the flash drum 8, on the side of the concentrated product 11, there is an outlet pipe 12, which directly communicates with the intake opening of an extraction pump 13. The extraction pump 13 has two functions: by means of a pipe 14 it sends a portion of the concentrated product to the using area and by means of a pipe 15 it brings back the portion of the concentrated product which is not immediately utilized, into the flash drum 8 on the side of the concentrated product 11. The separation of the product into these two portions is achieved by means of suitable valves, diagrammatically indicated at 16 and 17, responsive to the quantity of product necessary for use.

Two pipelines 18 and 19 are also provided at the lower part of the flash drum 8, on the side of the concentrated product 11 and on the side product 10 not yet concentrated, respectively. The pipelines 18, 19 lead their respective products, those concentrated and those not yet concentrated, to be mixed at the intake opening of a circulating pump 20. However nothing prevents this mixing from taking place close to the delivery side of the circulating pump 20. In fact this mixing is merely for the purpose of supplying a product having a lower concentration to the circuit which will be described later, thereby allowing a greater heat exchange, a reduction of the exchange surfaces and smaller losses in pressure due to friction in the circuit.

Through a piping 21 the mixed product (by way of example, in the case of grape-must the concentrated product has 620 g of sugar/liter while the product to concentrate has 200 g of sugar/liter; therefore the mixed product will have sugar concentration value equal to the weighted average of the two products) is sent under pressure to a battery of heat exchangers 22, 23, 24, 25, 26, 27 and 28.

Said exchangers are of the tube nest type in which the passage of the product to be heated occurs inside the tubes, the tubes being interconnected in series by pipelines 22a, 23a, 24a, 25a, 26a and 27a.

As the product to be concentrated passes from one exchanger to the next, its temperature increases in successive increments. The temperature gradient in the last exchanger is twice that obtained in each single preceding exchanger.

Exchangers 22, 23, 24, 25, 26 and 27 are heated by water vapors generated in flash drums 29, 30, 31, 32, 33 and 34, as described in more detail later, and by means of steam produced by hot condensate liquids which pass from one exchanger to the preceding one, going countercurrent with respect to the flow of the product to concentrated.

Water vapors coming from flash drums 29, 30, 31, 32, 33 and 34 are conveyed to their respective exchangers 27, 26, 25, 24, 23 and 22 through pipelines 35, 36, 37, 38, 39 and 40, while steam derived from condensate liquids, which pass from one exchanger to the preceding one going countercurrent to the flow of the product to concentrated, are conveyed through pipelines 41, 42, 43, 44 and 45.

On the other hand, the exchanger 28 is directly heated by steam coming from the system (boiler), through piping 46.

Said live steam also supplies a turbine (not shown in the figure) which in turn actuates the circulating pump 20.

Hot condensate liquids coming out of the exchanger 28 are then directly conveyed, through piping 47, to heat the preheater 6. At the outlet of the preheater 6 piping 48, partly shown, brings the condensate liquids again into the boiler. The preheater 5 is, on the other hand, heated by hot condensate liquids coming out of the exchanger 22. These liquids have previously passed, in cascade, through the exchangers 27, 26, 25, 24 and 23. The piping arranged to supply these condensate liquids is indicated at 49.

An exhaust pipe 50 discharges the condensate liquids, which cannot be sent back to the boiler as they contain a certain quantity of acids dissolved therein; so, after purification, they are disposed of.

Steam traps 51 are arranged in the hot condensate pipelines.

The product to be concentrated coming out of the exchanger 28 is then conveyed, through piping 52, to the flash drum 29.

In the flash drum 29 the product is subjected to a first expansion and consequently to cooling, according to a predetermined temperature gradient. Water vapor produced therein will then heat the exchanger 27, passing through piping 35.

At this point, by means of pipelines 60, the product successively passes into the flash drums 30, 31, 32, 33 and 34, respectively, where it is subjected to a further expansion and cooling while releasing water vapor which, through pipelines 36, 37, 38, 39 and 40, heats the exchangers 26, 25, 24, 23 and 22.

Finally, through piping 53 the product which is almost completely concentrated reaches the last flash drum 8, where it is subjected to a last expansion and consequent cooling equal to a temperature gradient which is nearly twice the one obtained in the preceding flash drums 29, 30, 31, 32, 33 and 34.

Water vapor produced in the flash drum 8, through a piping 54, then reaches a barometric condenser 55, where a vacuum is formed by means of a suitable pump 56 or ejector or the like. The barometric condenser 55 is also provided with piping 57 for adding water coming from the system.

Finally, pipeline 58, connected to the bottom of condenser 55, leads hot water coming from mixing in condenser 55 to the exhaust 59.

However, instead of evacuating the water, it is possible to make it pass through a cooling tower, so that it can be utilized again during the cooling cycle.

The advantages achieved by adopting the plant of the present invention can be summarized as follows:

all the exchangers except the last one have the same size and can be made in series, which causes a remarkable reduction in the installation costs;

all the flash drums except the last one (which has a lower temperature) can be standardized to the diameter of the biggest flash drum, which affords clear advantages for their construction in series and very low economic costs;

energy saving is remarkable owing to the fact that in order to produce the heat necessary for heating the product to be concentrated, both steam derived from hot condensate liquids in the exchangers and water vapors coming from the flash drums are used.

Obviously, although the embodiment of the present invention described hereinbefore by way of example is the preferred one, the invention is not limited thereto and thereby and many structural modifications can be carried out within the scope of the claims.

What is claimed is:

1. A forced circulation evaporator plant for processing a product to be concentrated, comprising:

product storage means, means for supplying a product to be concentrated to said product storage means, a circulating pump connected to said product storage means, a plurality of heat exchangers connected in series with one another and to said circulating pump, a plurality of flash drums connected in series with one another and to said product storage means, each of said flash drums being also connected to a different one of said heat exchangers, thereby respectively supplying heating vapors thereto, product storage means having at least two compartments, a first of said compartments storing said product before concentration and a second of said compartments storing said product after concentration, means for withdrawing said product from said first and second compartments in predetermined proportions to form a mixed product, said mixed product circulating through said heat exchangers and flash drums in series, becoming progressively more concentrated, and returning as concentrated product to said second compartment, and means for withdrawing said concentrated product from said second compartment for use.

2. An evaporator plant according to claim 1, wherein said product storage means is arranged and constructed to serve as an additional flash drum.

3. An evaporator plant according to claim 1, wherein said circulating pump is interposed between said product storage means and said heat exchangers.

4. An evaporator plant according to claim 1, further comprising preheating means for heating said product to be concentrated before said product to be concentrated is supplied to said product storage means.

5. An evaporator plant according to claim 1, further comprising a barometric condenser connected to said product storage means and means connected to said barometric condenser for forming a relative vacuum therein.

* * * * *